United States Patent
Seo et al.

(10) Patent No.: US 11,837,194 B2
(45) Date of Patent: Dec. 5, 2023

(54) ELECTRONIC APPARATUS AND CONTROLLING METHOD THEREOF

(71) Applicant: SAMSUNG ELECTRONICS CO., LTD., Suwon-si (KR)

(72) Inventors: Gaewon Seo, Suwon-si (KR); Sungchang Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/697,292

(22) Filed: Mar. 17, 2022

(65) Prior Publication Data
US 2022/0246112 A1 Aug. 4, 2022

Related U.S. Application Data

(63) Continuation of application No. PCT/KR2021/013669, filed on Oct. 6, 2021.

(30) Foreign Application Priority Data

Jan. 29, 2021 (KR) .................. 10-2021-0013661
May 14, 2021 (KR) .................. 10-2021-0062823

(51) Int. Cl.
  *G06F 3/04847* (2022.01)
  *G09G 5/32* (2006.01)
  *G09G 5/00* (2006.01)

(52) U.S. Cl.
  CPC ........... *G09G 5/32* (2013.01); *G06F 3/04847* (2013.01); *G09G 5/006* (2013.01);
  (Continued)

(58) Field of Classification Search
  CPC .. G09G 5/32; G09G 5/006; G09G 2340/0471; G09G 2340/0478; G09G 2340/12; G06F 3/04847
  See application file for complete search history.

(56) References Cited

U.S. PATENT DOCUMENTS 8,826,335 B2   9/2014   Takenaka
9,250,707 B2   2/2016   Choi et al.
(Continued)

FOREIGN PATENT DOCUMENTS

JP   2011-250067 A   12/2011
KR   10-0199882 B1   6/1999
(Continued)

OTHER PUBLICATIONS

International Search Report (PCT/ISA/210) dated Jan. 21, 2022 by the International Searching Authority in counterpart International Patent Application No. PCT/KR021/013669.
(Continued)

*Primary Examiner* — Robert J Michaud
(74) *Attorney, Agent, or Firm* — Sughrue Mion, PLLC

(57) ABSTRACT

An electronic apparatus, including a memory configured to store information related to Graphical User Interface (GUI); a display; and a processor configured to: control the display to display a content area including a content and a black box area generated based on an aspect ratio of the content area and an aspect ratio of the display; based on receiving a user command for displaying a GUI, determine whether the content has a predetermined type based on type information of the content; based on determining that the content has the predetermined type, determine whether the GUI is included in the black box area based on a size of the GUI and a size of the black box area; and based on determining that the GUI is not included in the black box area, adjust a display position of the content area such that the GUI is included in the black box area.

18 Claims, 10 Drawing Sheets

(52) U.S. Cl.
CPC ............... *G09G 2340/0471* (2013.01); *G09G 2340/0478* (2013.01); *G09G 2340/12* (2013.01)

(56) References Cited

U.S. PATENT DOCUMENTS

| | | |
|---|---|---|
| 9,454,799 B2 | 9/2016 | Baek |
| 9,854,323 B2 | 12/2017 | Baek |
| 9,860,474 B2 | 1/2018 | Park et al. |
| 10,534,434 B2 | 1/2020 | Yoo et al. |
| 2008/0062256 A1 | 3/2008 | Yamauchi et al. |
| 2011/0292285 A1 | 12/2011 | Takenaka |
| 2013/0083078 A1 | 4/2013 | Dai et al. |
| 2014/0089849 A1 | 3/2014 | Choi et al. |
| 2016/0042494 A1 | 2/2016 | Baek |
| 2016/0132222 A1* | 5/2016 | Yoo .................. G06F 3/016 715/763 |
| 2016/0345071 A1 | 11/2016 | Baek |
| 2017/0013255 A1 | 1/2017 | Newton et al. |
| 2018/0167576 A1 | 6/2018 | Chaudhri |

FOREIGN PATENT DOCUMENTS

| | | |
|---|---|---|
| KR | 10-0430876 B1 | 5/2004 |
| KR | 10-2013-0029779 A | 3/2013 |
| KR | 10-2013-0076028 A | 7/2013 |
| KR | 10-2014-0039641 A | 4/2014 |
| KR | 10-2014-0144029 A | 12/2014 |
| KR | 10-2016-0019293 A | 2/2016 |
| KR | 10-2016-0056728 A | 5/2016 |

OTHER PUBLICATIONS

Written Opinion (PCT/ISA/237) dated Jan. 21, 2022 by the International Searching Authority in counterpart International Patent Application No. PCT/KR2021/013669.

* cited by examiner

ELECTRONIC APPARATUS AND CONTROLLING METHOD THEREOF

CROSS-REFERENCE TO RELATED APPLICATION(S)

This application is a bypass continuation of International Application No. PCT/KR2021/013669, filed on Oct. 6, 2021, which is based on and claims priority to Korean Patent Application No. 10-2021-0013661, filed on Jan. 29, 2021, and Korean Patent Application No. 10-2021-0062823, filed on May 14, 2021, in the Korean Intellectual Property Office, the disclosures of which are incorporated by reference herein in their entireties.

BACKGROUND

1. Field

This disclosure relates to an electronic apparatus and a controlling method thereof and more particularly, to an electronic apparatus that displays a GUI and a controlling method thereof.

2. Description of Related Art

Recently, large-scale display devices have been developed and popularized.

In addition, the screen ratio of a display device and the screen ratio of a content that a user encounters are not limited to the conventional 4:3 ratio, but are changing in various ways.

Meanwhile, the number of users enjoying game contents or movie contents that require high concentration through a display device, for example a television (TV), provided in the house with no disturbance to the feeling of immersion is increasing.

The display device provided in the house frequently displays a GUI for controlling the volume, screen brightness, etc., and such a GUI is displayed in the area where game contents or movie contents are displayed, which are problems that disturb the user's immersion.

For example, if a GUI for controlling the volume covers a character object that moves according to a user command in the game contents, there is a problem in that the user is interrupted when determining the instantaneous movement of the character object.

There has been a demand for a method for smoothly providing a GUI for adjusting a setting value, for example a volume, of a display device without interfering with immersion, viewing, etc. for the content that is currently being provided.

SUMMARY

The disclosure has been made to solve the above-described problem, and an object of the disclosure is to provide an electronic apparatus that provides a GUI in consideration of a ratio of a content and a display and a controlling method thereof.

In accordance with an aspect of the disclosure, an electronic apparatus includes a memory configured to store information related to Graphical User Interface (GUI); a display; and a processor configured to: control the display to display a content area including a content and a black box area generated based on an aspect ratio of the content area and an aspect ratio of the display; based on receiving a user command for displaying a GUI, determine whether the content has a predetermined type based on type information of the content; based on determining that the content has the predetermined type, determine whether the GUI is included in the black box area based on a size of the GUI and a size of the black box area; and based on determining that the GUI is not included in the black box area, adjust a display position of the content area such that the GUI is included in the black box area.

The processor may be further configured to: control the display to display a first black box area at an upper side of the content area and a second black box area at a lower side of the content area, wherein the first black box area and the second black box area are generated based on the aspect ratio of the content area and the aspect ratio of the display; and based on determining that the GUI is not included in the first black box area and the second black box area, adjust the display position of the content area in an upper side direction or a lower side direction.

The processor may be further configured to increase a size of one of the first black box area or the second black box area and decrease a size of another one of the first black box area or the second black box area, by adjusting the display position of the content area in the upper side direction or the lower side direction, and control the display to display the GUI in the one of the first black box area or the second black box area having the increased size.

The processor may be further configured to adjust the display position of the content area in the upper side direction or the lower side direction based on information about an object included in an upper area of the content area and a lower area of the content area.

The the processor may be further configured to: based on determining that the content has the predetermined type, determine whether the GUI is included in the black box area based on a size of the GUI and a size of the black box area obtained based on information related to the GUI; and based on determining that the GUI is not included in the black box area, adjust the size of the GUI such that the GUI is included in the black box area, and control the display to display the GUI having the adjusted size in the black box area.

The information related to the GUI may include color information when the GUI is displayed in the black box area; and the processor may be further configured to, based on determining that the content has the predetermined type, control the display to display the GUI in the black box area based on the color information.

The processor may be further configured to: control the display to display an adjustment GUI for adjusting the display position of the content area according to a user command for adjusting the display position of the content area; and control the display to adjust the display position of the content area to an upper side or to a lower side according to a user input regarding the adjustment GUI.

The processor may be further configured to: based on the aspect ratio of the content area being equal to the aspect ratio of the display, control the display to display the content area by reducing a size of the content area while maintaining the aspect ratio of the content area; control the display to display the black box area as the size of the content area is reduced; control the display to display the GUI in the black box area; and based on receiving a user input regarding the GUI, control the display to display the content area by restoring the size of the content area to an original size.

The type information of the content may include a game type.

In accordance with an aspect of the disclosure, a controlling method of an electronic apparatus including a display includes displaying a black box area generated based on an aspect ratio of a content area including a content and an aspect ratio of the display; based on receiving a user command for displaying a GUI, determining whether the content has a predetermined type based on type information of the content; based on determining that the content has the predetermined type, determining whether the GUI is included in the black box area based on a size of the GUI and a size of the black box area; and based on determining that the GUI is not included in the black box area, adjusting a display position of the content area such that the GUI is included in the black box area.

The displaying of the black box area may include displaying a first black box area at an upper side of the content area and a second black box area at a lower side of the content area, wherein the first black box area and the second black box area are generated based on the aspect ratio of the content area and the aspect ratio of the display; and the determining of the display position may include, based on determining that the GUI is not included in the first black box area and the second black box area, adjusting the display position of the content area in an upper side direction or a lower side direction.

The adjusting a display position may include: increasing a size of one of the first black box area or the second black box area and decreasing a size of another one of the first black box area or the second black box area, by adjusting the display position of the content area in the upper side direction or the lower side direction; and displaying the GUI the one of the first black box area or the second black box area having the increased size.

The adjusting the display position may include adjusting the display position of the content area in the upper side direction or the lower side direction based on information about an object included in an upper area of the content area and a lower area of the content area.

The displaying the GUI in the black box area may include: based on determining that the GUI is not included in the black box area, adjusting the size of the GUI such that the GUI is included in the black box area; and displaying the GUI having the adjusted size in the black box area.

The information related to the GUI may include color information when the GUI is displayed in the black box area; and the displaying the GUI in a black box area may include, based on determining that the content has the predetermined type, displaying the GUI in the black box area based on the color information.

In accordance with an aspect of the disclosure, a controlling method of an electronic apparatus including a display includes displaying a black box area generated based on an aspect ratio of a content area including a content and an aspect ratio of the display; displaying a GUI on the display; determining whether the GUI is entirely included in the black box area based on a size of the GUI and a size of the black box area; and based on determining that a portion of the GUI is not included in the black box area, adjusting at least one from among a display position of the content area or the size of the GUI such that the GUI is entirely included in the black box area.

The black box area may include a first black box area and a second black box area, and the adjusting may include adjusting the display position of the content area such that the GUI is entirely included in one from among the first black box area and the second black box area.

According to various embodiments, both a GUI and a content may be displayed without interference with immersion and viewing by adjusting the display position of the content.

By adjusting the display position of the content or adjusting the size of the GUI, the GUI may be displayed without blocking an area of the content or compromising resolution.

DETAILED DESCRIPTION

Figure 1:
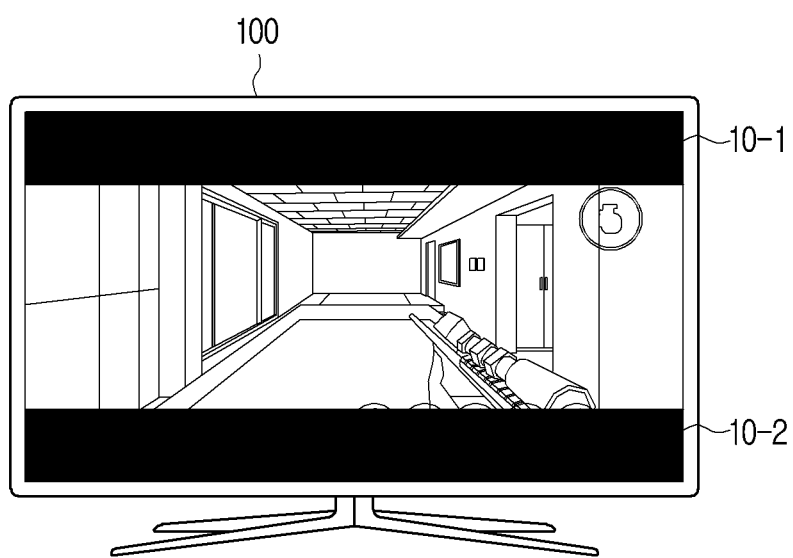
FIG. 1 is a view provided to explain a black box area according to an embodiment.

After terms used in the specification are briefly described, the disclosure will be described in detail.

General terms that are currently widely used were selected as terms used in embodiments of the disclosure in consideration of functions in the disclosure, but may be changed depending on the intention of those skilled in the art or a judicial precedent, an emergence of a new technique, and the like. In addition, in a specific case, terms may be arbitrarily chosen. In this case, the meaning of such terms will be mentioned in detail in a corresponding description portion of the disclosure. Therefore, the terms used in the disclosure should be defined on the basis of the meaning of the terms and the contents throughout the disclosure rather than simple names of the terms.

Embodiments of the disclosure may apply various modifications and have various embodiments, and specific embodiments will be illustrated in the drawings and described in detail in the detail description. However, this is not intended to limit the scope to the specific embodiment, and it should be understood to include all modifications, equivalents, and substitutes included in the scope of the disclosed spirit and technology. In describing the embodiments, when it is determined that the detailed description of the related known technology may obscure the gist, the detailed description thereof will be omitted.

Terms 'first', 'second', and the like, may be used to describe various components, but the components are not to be construed as being limited by the terms. The terms are used only to distinguish one component from other components.

Singular expressions include plural expressions unless the context clearly indicates otherwise. It should be further understood that terms "include" or "constitute" used in the application specify the presence of features, numerals, steps, operations, components, parts, or combinations thereof mentioned in the specification, but do not preclude the presence or addition of one or more other features, numerals, steps, operations, components, parts, or combinations thereof.

In the description, the word "module" or "unit" refers to a software component, a hardware component, or a combination thereof, which is capable of carrying out at least one function or operation. A plurality of modules or units may be integrated into at least one module and realized using at least one processor except for those modules or units that need to be realized in specific hardware.

Hereinafter, embodiments of the disclosure will be described in detail with reference to the accompanying drawings so that those skilled in the art to which the disclosure pertains may easily practice the disclosure. However, the disclosure may be implemented in various different forms and is not limited to the embodiments described herein. In addition, in the drawings, portions unrelated to the description will be omitted to obviously describe the disclosure, and similar portions will be denoted by similar reference numerals throughout the specification.

FIG. 1 is a view provided to explain a black box area according to an embodiment.

Referring to FIG. 1, an electronic apparatus 100 includes a display, and may provide various types of contents through the display.

Here, the electronic apparatus 100 may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, medical devices, cameras, virtual reality (VR) implementation devices, or wearable devices. Here, the wearable device may include at least one of an accessory type device (e.g., a timepiece, a ring, a bracelet, an anklet, a necklace, glasses, a contact lens, or a head-mounted-device (HMD)), one-piece fabric or clothes type circuit (e.g., electronic cloth or electronic clothing), a body-attached type circuit (e.g., a skin pad or a tattoo), or a bio-implantable type circuit. According to some embodiments, the electronic apparatus 100 may include at least one of televisions (TVs), digital versatile disc (DVD) players, audios, refrigerators, air-conditioners, cleaners, ovens, microwave ovens, washing machines, air cleaners, set-top boxes, home automation control panels, security control panels, media boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to an embodiment, the electronic apparatus 100 may include at least one of medical devices, such as for example various portable medical measurement devices such as a blood glucose monitoring device, a heartbeat measuring device, a blood pressure measuring device, a body temperature measuring device, and the like, a magnetic resonance angiography (MRA), a magnetic resonance imaging (MRI), a computed tomography (CT), scanners, and ultrasonic devices, etc. According to an embodiment, the electronic apparatus 100 may include at least one of navigation devices, global navigation satellite system (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, drones, automatic teller's machines (ATMs) of banking institutions, points of sales (POSs) of stores, or internet of things type devices (e.g., light bulbs, various sensors, sprinkler devices, fire alarms, thermostats, street lamps, toasters, exercise equipment, hot water tanks, heaters, boilers, and the like).

The electronic apparatus 100 according to an embodiment may display various types of contents. The electronic apparatus 100 according to an embodiment may be implemented as a user terminal device or a TV, but is not limited thereto. For example, the electronic apparatus 100 can be applicable to any device having a display function such as a video wall, a large format display (LFD), a digital signage, a Digital Information Display (DID), a projector display, etc. In addition, the electronic apparatus 100 may be implemented as various types of displays such as a liquid crystal display (LCD), an organic light-emitting diode (OLED), a Liquid Crystal on Silicon (LCoS), a Digital Light Processing (DLP), a quantum dot (QD) display panel, quantum dot light-emitting diodes (QLED), Micro light-emitting diodes (μLED), a Mini LED, etc. In embodiments, the electronic apparatus 100 may be implemented as a touch screen combined with a touch sensor, a flexible display, a rollable display, a 3D display, a display in which a plurality of display modules are physically connected, etc. Hereinafter, it is assumed that the electronic apparatus 100 is implemented as a TV for convenience of explanation.

Referring to FIG. 1, the electronic apparatus 100 may display a content without loss of resolution of the content, for example without a cropped area.

For example, if the aspect ratio of the content is different from the aspect ratio of the display provided in the electronic apparatus 100, the electronic apparatus 100 may generate an area in which the content is not displayed in order to display the corresponding content while maintaining the aspect ratio of the content.

For example, if the aspect ratio of the content is 16:9 and the aspect ratio of the display is 4:3, the electronic apparatus 100 may adjust the size of the content area or the ratio of the content area so that the width, which may be for example the horizontal ratio, of the content area on which the content is displayed in the display matches the width, or horizontal ratio, of the display. Here, the aspect ratio of the resized content area or the aspect ratio of the ratio-adjusted content area is maintained at 16:9 and thus, the electronic apparatus 100 may generate a black box area on the upper side and the lower side of the content area, respectively. Here, the black box area refers to an area of the display in which a content is not displayed, and it may not necessarily be displayed in the form of a black band.

Referring to FIG. 1, the electronic apparatus 100 may display a content while maintaining the aspect ratio of the content itself, and may generate a first black box area 10-1 on the upper side of the content area where the content is displayed and a second black box area 10-2 on the lower side of the content area. Here, the first black box area 10-1 and the second black box area 10-2 have the same size and thus, the content area where the content is displayed may be located in the center of the display. However, this is only an example and embodiments are not limited thereto. In another example, the first black box area 10-1 may be relatively smaller than the second black box area 10-2, and the content area may be located at a relatively upper side of the display.

Here, the black box area 10, which may for example include both black box area 10-1 and black box area 10-2, may be referred to as a letterbox. For example, when a content having the aspect ratio such as 16:9, 21:9 or 32:9 is displayed in a display having a relatively short width, or horizontal ratio, the electronic apparatus 100 may generate two black bands at the top and bottom of the display, respectively, in order to maintain the aspect ratio of the content. Such a black band may be referred to as a letterbox and hereinafter, it will be referred to as the black box area 10 for convenience of explanation.

Meanwhile, in the present disclosure, it is assumed that the block box area 10 is generated at the top and bottom of the display for convenience of explanation, but this is only an example. Embodiments are not limited thereto.

In another example, when a content having the aspect ratio of 4:3, etc. is displayed in a display having a relatively long width, or horizontal ratio, the electronic apparatus 100 may generate two black bands on the left and right side of the display, respectively, in order to maintain the aspect ratio of the content. Such a black band may be referred to as a pillarbox.

Various embodiments of the present disclosure may be implemented in both a letterbox and a pillarbox in the display and thus, both a letterbox and a pillarbox will be referred to as the black box area 10 without distinction for convenience of explanation.

Figure 2:
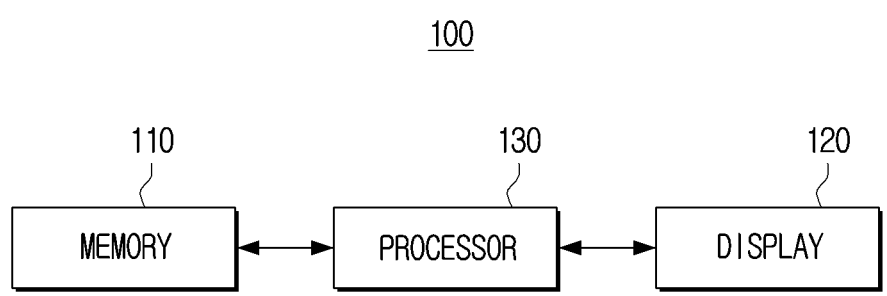
FIG. 2 is a block diagram provided to explain configuration of an electronic apparatus according to an embodiment.

FIG. 2 is a block diagram provided to explain configuration of an electronic apparatus according to an embodiment.

Referring to FIG. 2, the electronic apparatus 100 may include a memory 110, a display 120 and a processor 130.

The memory 110 provided in the electronic apparatus 100 according to an embodiment may be implemented as an internal memory such as a read-only memory (ROM) (e.g., electrically erasable programmable read-only memory (EE-PROM)), a random access memory (RAM) or the like, which is included in the processor 130, or may be implemented as a memory separate from the processor 130. In this case, the memory 110 may be implemented in a form of a memory embedded in the electronic apparatus 100 or a form of a memory attachable to and detachable from the electronic apparatus 100, depending on a data storing purpose. For example, data for driving the electronic apparatus 100 may be stored in the memory embedded in the electronic apparatus 100; and data for an extension function of the electronic apparatus 100 may be stored in the memory attachable to and detachable from the electronic apparatus 100. For example, data for driving the electronic apparatus 100 may be stored in the memory embedded in the electronic apparatus 100; and data for an extension function of the electronic apparatus 100 may be stored in the memory attachable to and detachable from the electronic apparatus 100. In case of being implemented as the memory embedded in the electronic apparatus 100, the memory may be implemented as at least one of a volatile memory (e.g., a dynamic random access memory (DRAM), a static RAM (SRAM), a synchronous dynamic RAM (SDRAM), etc.), a non-volatile memory (e.g., a one time programmable read-only memory (OTPROM), a programmable ROM (PROM), an erasable and programmable ROM (EPROM) and an electrically erasable and programmable ROM (EEPROM)), a mask ROM, a flash ROM, etc.), a flash memory (e.g., a NAND flash, a NOR flash, etc.), a hard drive, or a solid state drive (SSD)). In case of being implemented as the memory attachable to and detachable from the electronic apparatus 100, the memory may be implemented as a memory card (e.g., a compact flash (CF), a secure digital (SD), a micro secure digital (Micro-SD), a mini secure digital (Mini-SD), an extreme digital (xD), a multi-media card (MMC), etc.), or an external memory (e.g., a universal serial bus (USB) memory) that can be connected to a USB port.

In particular, the memory 110 according to an embodiment may store information related to Graphical User Interface (GUI). Here, the GUI may include a UI, an On Screen Display (OSD) menu (e.g., RGB adjustment, brightness/contrast adjustment, etc.), etc. which are displayed for changing the setting of the electronic apparatus 100. However, this is only an example, the GUI may include various forms of UX/UI displayed on the display 120. For example, the GUI may include a content other than the content which is currently displayed, a notification provided by another application, a pop-up, etc.

In other words, the GUI according to various embodiments may include various forms of UX/UI that are additionally displayed on the display 120 in addition to the content included in the content area.

Here, the GUI-related information may include a display position of the GUI, configuration of the GUI, a size of the GUI, a color of the GUI, and a setting value related to the electronic apparatus 100, which is changeable through the GUI.

The display 120 according to an embodiment may be implemented as various types of displays such as a liquid crystal display (LCD), an organic light-emitting diode (OLED), a Liquid Crystal on Silicon (LCoS), Digital Light Processing (DLP), a quantum dot (QD) display panel, quantum dot light-emitting diodes (QLED), Micro light-emitting diodes (μLED), Mini LED, etc. Meanwhile, the display 120 may be implemented as a touch screen combined with a touch sensor, a flexible display, a rollable display, a 3D display, a display in which a plurality of display modules are physically connected, etc.

The processor 130 controls the overall operations of the electronic apparatus 100.

The processor 130 according to an embodiment may be implemented as at least one of a digital signal processor (DSP) for processing digital image signals, a microprocessor, or a time controller (TCON), but are not limited thereto. The processor 130 may include at least one of a central processing unit (CPU), a micro controller unit (MCU), a micro processing unit (MPU), a controller, an application processor (AP), a communication processor (CP) or an ARM processor, or may be defined as the corresponding term. Further, the processor 130 may be implemented as a System on Chip (SoC) integrated with a processing algorithm, a large scale integration (LSI), or in the form of a field programmable gate array (FPGA).

The processor 130 according to an embodiment may compare the aspect ratio of the content area including a content and the aspect ratio of the display, and control the display 120 to display a black box area based on a result of the comparison.

The above embodiment will be described in detail with reference to FIG. 3.

Figure 3:
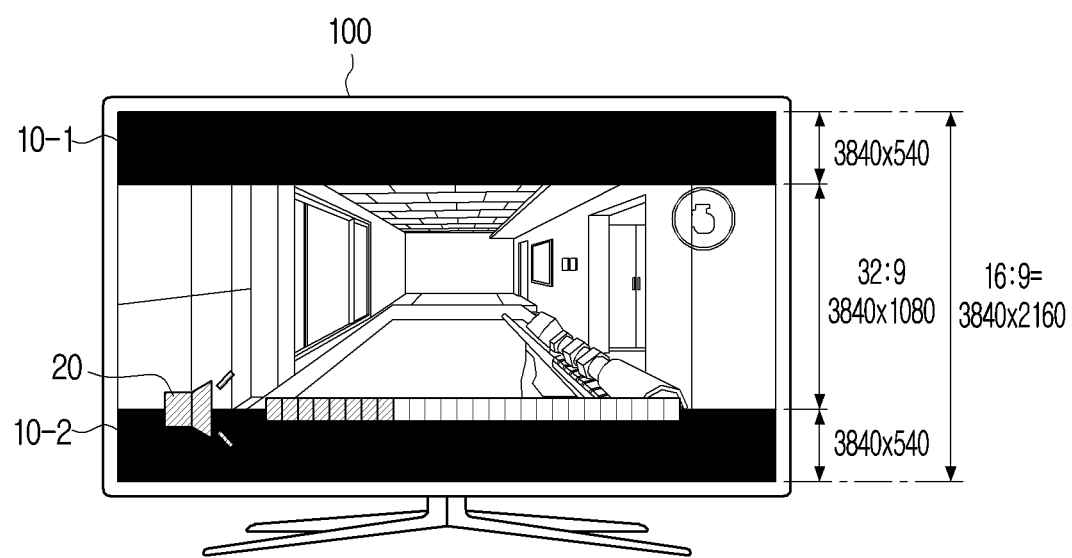
FIG. 3 is a view provided to explain an aspect ratio and a GUI according to an embodiment.

FIG. 3 is a view provided to explain an aspect ratio and a GUI according to an embodiment.

In FIG. 3, the aspect ratio of the content area may be 32:9 and the aspect ratio of the display 120 may be 16:9 for convenience of explanation. Here, the specific numbers are only examples, and they may vary depending on embodiments.

Referring to FIG. 3, because the aspect ratio of the content, for example 32:9, is different from the aspect ratio of the display 120, for example 16:9, the processor 130 may display the first black box area 10-1 on the upper side of the content area and the second black box area 10-2 on the lower side of the content area in order to maintain the aspect ratio of the content area.

Here, the first black box area 10-1 and the second black box area 10-2 may have the same size and ratio. The content area may be located in the center of the display 120. Here, the center of the display 120 may mean a position that is not inclined toward either the upper side or the lower side.

Subsequently, when a user command for displaying a GUI is received, the processor 130 may control the display 120 to display the GUI within the black box area based on the type information of the content and the GUI-related information.

For example, the GUI displayed according to a user command may be a GUI for volume control. However, this is only an example, and the GUI displayed according to a user command may include various types of UX/UI for changing the setting of the electronic apparatus 100, a content other that the content which is currently displayed, or other applications as described above.

When it is identified that the content is a content of a predetermined type based on the type information of the content, the processor 130 may identify whether the GUI is included in the black box area based on the size of the GUI obtained based on the GUI-related information and the size of the black box area.

Here, the predetermined type may be a type set according to the purpose of a manufacturer or a user or a type set according to metadata of the content, etc.

For example, in the case of a game content, a sports content, a movie content, etc., a user's immersion may be disturbed if a part of the content area is covered by a GUI, etc. If the content is a content of a predetermined type, for example a game content, the processor 130 may identify whether the GUI is displayed in the black box area, for example whether a part of the content area is not covered even if the GUI is displayed, before the GUI according to a user command is displayed.

In another example, if a content is identified as a content in which a part of the content area is set not to be covered by a GUI when the GUI is displayed in addition to the content based on metadata of the content, the processor 130 may identify whether the GUI is displayed in the black box area before the GUI according to a user command is displayed.

In another example, if a content is not a content of a predetermined type, for example if the content is not the types discussed above, the processor 130 may immediately display a GUI without identifying whether the GUI according to a user command is displayed in the black box area.

Specifically, the processor 130 may identify the size and ratio of the content area based on the aspect ratio of the content and the aspect ratio of the display 120. In addition, the processor 130 may identify the size and ratio of each of the first black box area 10-1 and the second black box area 10-2. For example, the aspect ratio according to H_active and V_active of the content may be identified based on the metadata of the processor 130, and the size of the content area for displaying the content on the display 120 while maintaining the identified aspect ratio may be identified.

Subsequently, the size of the first black box area 10-1 and the second black box area 10-2 displayed on the upper side and the lower side of the content, respectively may be identified according to the identified size of the content area.

Referring to FIG. 3, the aspect ratio of the content area may be 32:9, and the size may be 3840X1080. The size of each of the first black box area 10-1 and the second black box area 10-2 may be 3840X540. Here, the specific numbers are only examples, and the ratio and size of each of the content area and the black box area may vary according to the aspect ratio of the content, the aspect ratio of the display 120, etc.

Subsequently, when the black box area 10 is displayed as the aspect ratio of the content area and the aspect ratio of the display 120 are different and the content is identified as a content of predetermined type, the processor 130 may display a GUI in the black box area 10 so that the GUI according to a user command does not cover a part of the content area.

For example, the processor 130 may position the GUI according to a user command in the first black box area 10-1 displayed on the upper side of the content area or in the second black box area 10-2 displayed on the lower side of the content area.

However, as illustrated in FIG. 3, if the size of the GUI is greater than the size of the black box area 10, there may be problem that the GUI covers a part of the content area, interfering with the user's immersion.

The processor 130 according to an embodiment may identify whether the GUI is included in the black box area based on the size of the GUI and the size of the black box area 10, and when it is identified that the GUI is not included, or for example not entirely included, in the black box area 10 based on a result of the identification, the processor 130 may adjust a display position of the content area, an example of which will be described in detail with reference to FIG. 4. In embodiments, when the GUI is not included, or not entirely included, in the black box area 10, this may mean that a portion of the GUI is included in the black box area 10, and another portion of the GUI is not included in the black box area 10, and is included in, for example, the content area.

Figure 4:
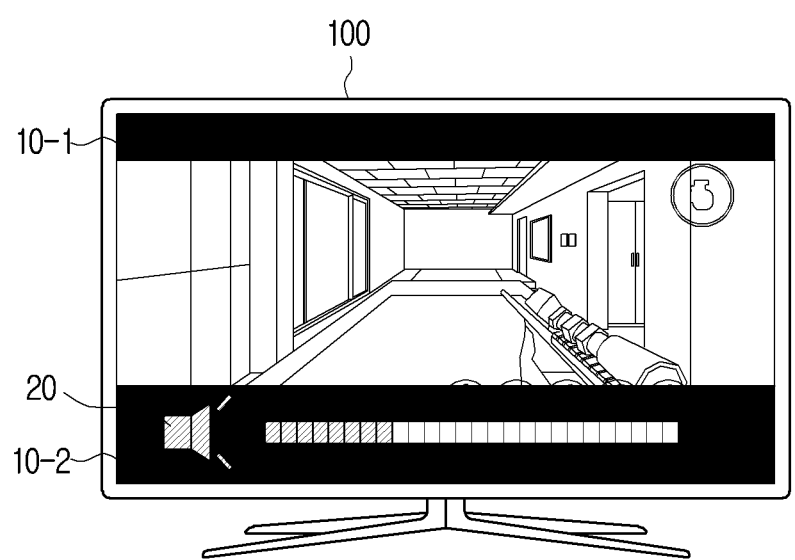
FIG. 4 is a view provided to explain a display position of a content area according to an embodiment.

FIG. 4 is a view provided to explain a display position of a content area according to an embodiment.

Referring to FIG. 4, if it is identified that the GUI which is displayed in addition to the content is not included, or for example not entirely included, in the first black box area 10-1 or the second black box area 10-2, the processor 130 may adjust a display position of the content area in the upper side or lower side direction.

For example, if it is identified that the size of a volume control GUI 20 is such that the volume control GUI 20 is not entirely included in the second black box area 10-2, the processor 130 may adjust the display position of the content area in the upper side direction. Accordingly, the processor 130 may decrease the size of the first black box area 10-1 and increase the size of the second black box area 10-2. Subsequently, the processor 130 may display the volume control GUI 20 in the black box area of which size has been increased, that is, in the second black box area 10-2.

Specifically, the processor 130 may identify a size, for example a height, of the black box area 10 for the GUI to be included in the black box area 10 based on the size of the GUI and the size of the black box area 10, and adjust the display position of the content area so that the black box area 10 is increased by the identified size.

In another example, if it is identified that the size of the volume control GUI 20 is such that the volume control GUI 20 is not entirely included in the first black box area 10-1, the processor 130 may adjust the display position of the content area in the lower side direction. Accordingly, the processor 130 may decrease the size of the second black box area 10-2, and increase the size of the first black box area 10-1. Subsequently, the processor 130 may display the volume control GUI 20 in the black box area of which size has been increased, that is, in the first black box area 10-1.

The priority of increasing one of the first black box area 10-1 or the second black box area 10-2 and decreasing the other may be not predetermined, and the black box area close to the display position of the GUI according to the GUI-related information from among a plurality of black box areas may be increased to display the GUI, and the remaining black box areas may be decreased.

In another example, the processor 130 may increase the black box area displayed on the lower side of the content area to display the GUI according to the priority, and may decrease the remaining black box area, for example the black box area displayed on the upper side.

Referring to FIG. 4, the volume control GUI 20 is included in the second black box area of which size has been increased, and the volume control GUI 20 does not cover a part of the content area. Thus, the user's immersion may be undisturbed.

Figure 5:
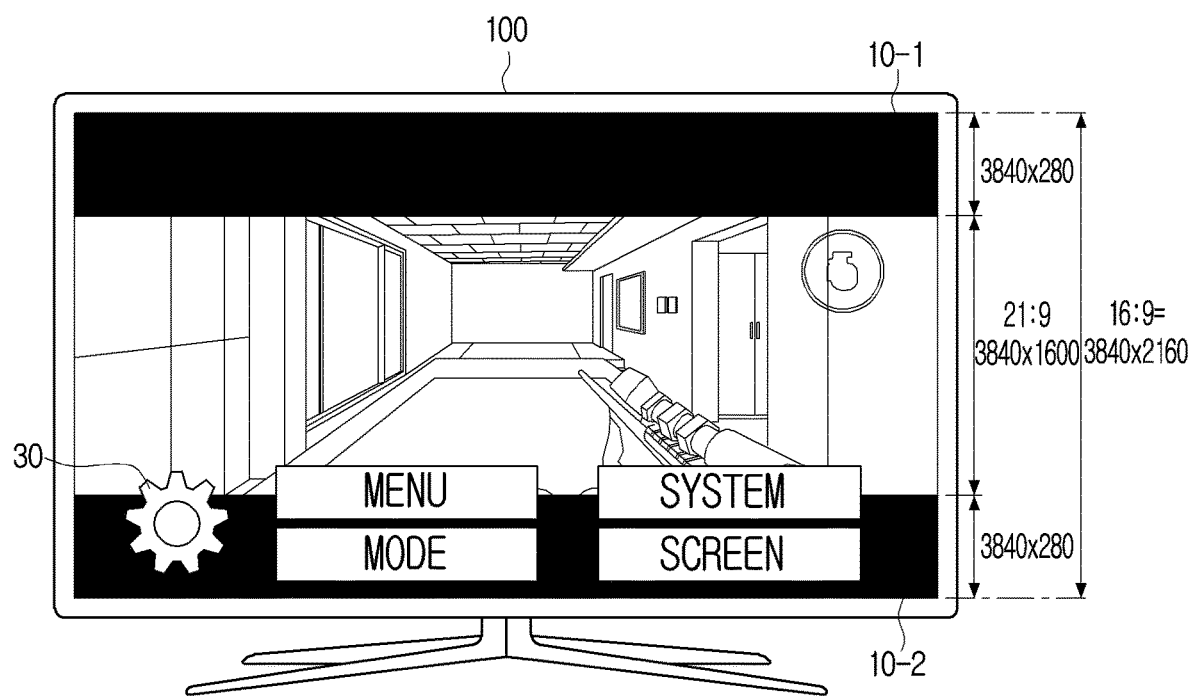
FIG. 5 is a view provided to explain an aspect ratio and a GUI according to another embodiment.

FIG. 5 is a view provided to explain an aspect ratio and a GUI according to another embodiment.

Referring to FIG. 5, the aspect ratio of the content area may be 21:9, and the aspect ratio of the display 120 may be 16:9. In embodiments, the specific numbers are only the examples of the aspect ratio of the content area and the display 120, and they may vary depending on embodiments.

The display 120 according to an embodiment may display a menu GUI 30 for changing the setting value of the display 120 under the control of the processor 130.

According to an embodiment, the size of the menu GUI 30 is greater than a size, for example a height, of the second black box area 10-2 and thus, the menu GUI 30 covers a part of the content area, causing a problem of interfering with the user's content viewing.

As described above, when it is identified that the menu GUI 30 is not included, or for example not entirely included, in the first black box area 10-1 or the second black box area 10-2, the processor 130 may increase the size of one of the first black box area 10-1 or the second black box area 10-2 and decrease the size of the other by adjusting the display position of the content area in the upper side direction or the lower side direction. Subsequently, the processor 130 may display the menu GUI 30 in the black box area of which size has been increased, for example, in the second black box area 10-2.

In the above-described embodiment, if the GUI is displayed for a predetermined time and then disappears, the processor 130 may move the display position of the content area to the center. In this case, the size of the first black box area 10-1 and the size of the second black box area 10-2 may be the same.

In another example, the processor 130 may maintain the display position of the content area even if the GUI disappears as a predetermined time elapses. For example, when the GUI is displayed more than a predetermined number of times, the user's immersion may be disturbed if the display position of the content area moves frequently. Thus, the processor 130 may maintain the display position of the content area as it is even if the GUI disappears after the GUI is displayed for a predetermined time.

In another example, the processor 130 may resize the menu GUI 30 based on the size of the black box area 10, and display the resized menu GUI 30 in the black box area 10, an example of which will be described in detail with reference to FIG. 6.

Figure 6:
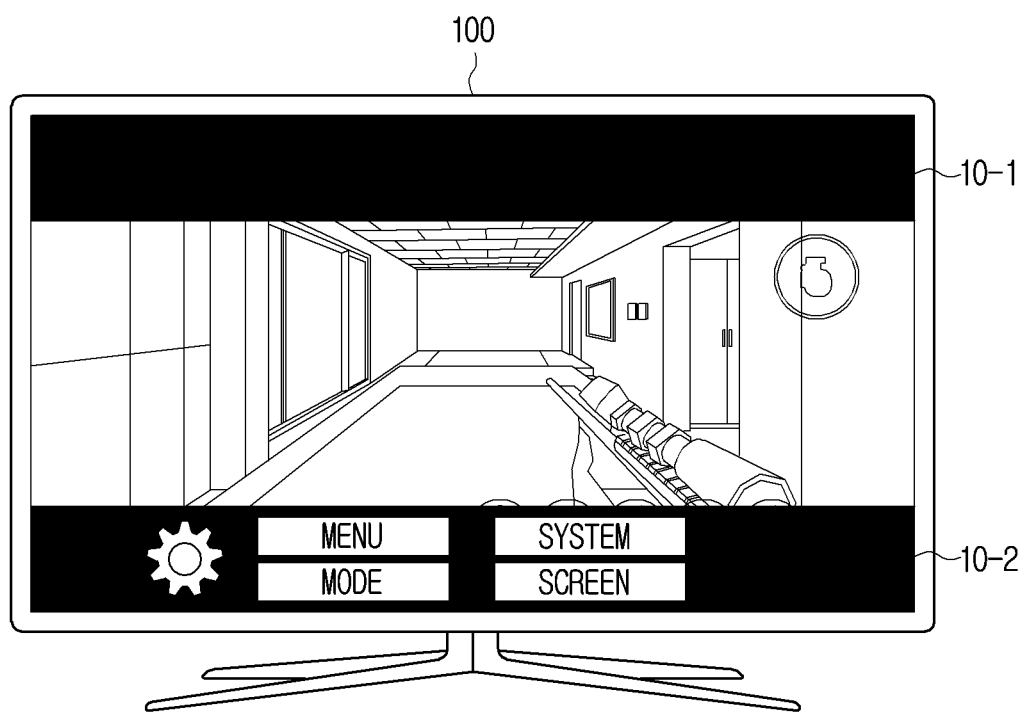
FIG. 6 is a view provided to explain resizing of a GUI according to an embodiment.

FIG. 6 is a view provided to explain resizing of a GUI according to an embodiment.

Referring to FIG. 6, if it is identified that the GUI is not included, or for example not entirely included, in the black box area, the processor 130 may adjust the size of the GUI so that the GUI is included in the black box area.

For example, if it is identified that the menu GUI 30 covers a part of the content area based on the size of the menu GUI 30 and the size of the second black box area 10-2, the processor 130 may resize the size of the menu GUI 30 based on the size of the second black box area 10-2.

Referring to FIG. 6, the processor 130 may decrease the size of the menu GUI 30 to correspond to the height of the second black box area 10-2 while maintaining the ratio of the menu GUI 30. Subsequently, the processor 130 may display the menu GUI 30 of which size has been decreased in the second black box area 10-2.

Meanwhile, if it is determined that it is difficult to identify the GUI when the processor 130 adjusts the size of the GUI, for example by reducing the size of the GUI, to correspond to the size of the black box area 10 while maintaining the ratio of the GUI, the processor 130 may adjust the display position of the content area instead of adjusting the size of the GUI and then, display the GUI in the black box area of which size is increased. For example, as the size of the GUI is reduced and thus, the size of the texts and images included in the GUI is reduced to less than a threshold size, it may be difficult to identify the GUI. Accordingly, when the size of the GUI needs to be reduced to less than a threshold size, the processor 130 may adjust the size of the black box area 10 rather than the size of the GUI and then, display the GUI in the black box area of which size is increased.

Figure 7:
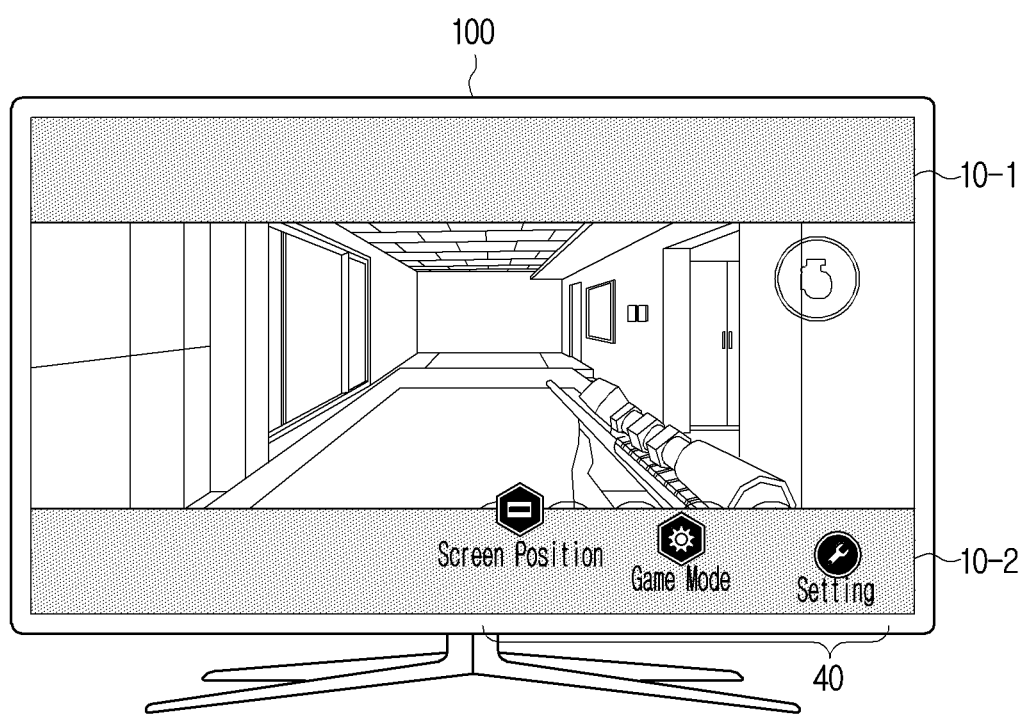
FIG. 7 is a view provided to explain a GUI for adjusting a display position of a content area according to an embodiment.

FIG. 7 is a view provided to explain a GUI 40 for adjusting a display position of a content area according to an embodiment.

According to an embodiment, the processor 130 may identify whether the GUI 40 covers a part of the content area, in other words, whether the GUI is included in the black box area 10 and then, automatically adjust the display position of the content area or the size of the GUI.

In another example, the processor 130 may adjust the display position of the content area according to a user command.

Referring to FIG. 7, the processor 130 may display a GUI 40 for adjusting the display position of the content area according to a user command. According to a user command regarding the GUI for adjusting the display position of the content area, the processor 130 may move the display position of the content area to the upper side or to the lower side.

Figure 8:
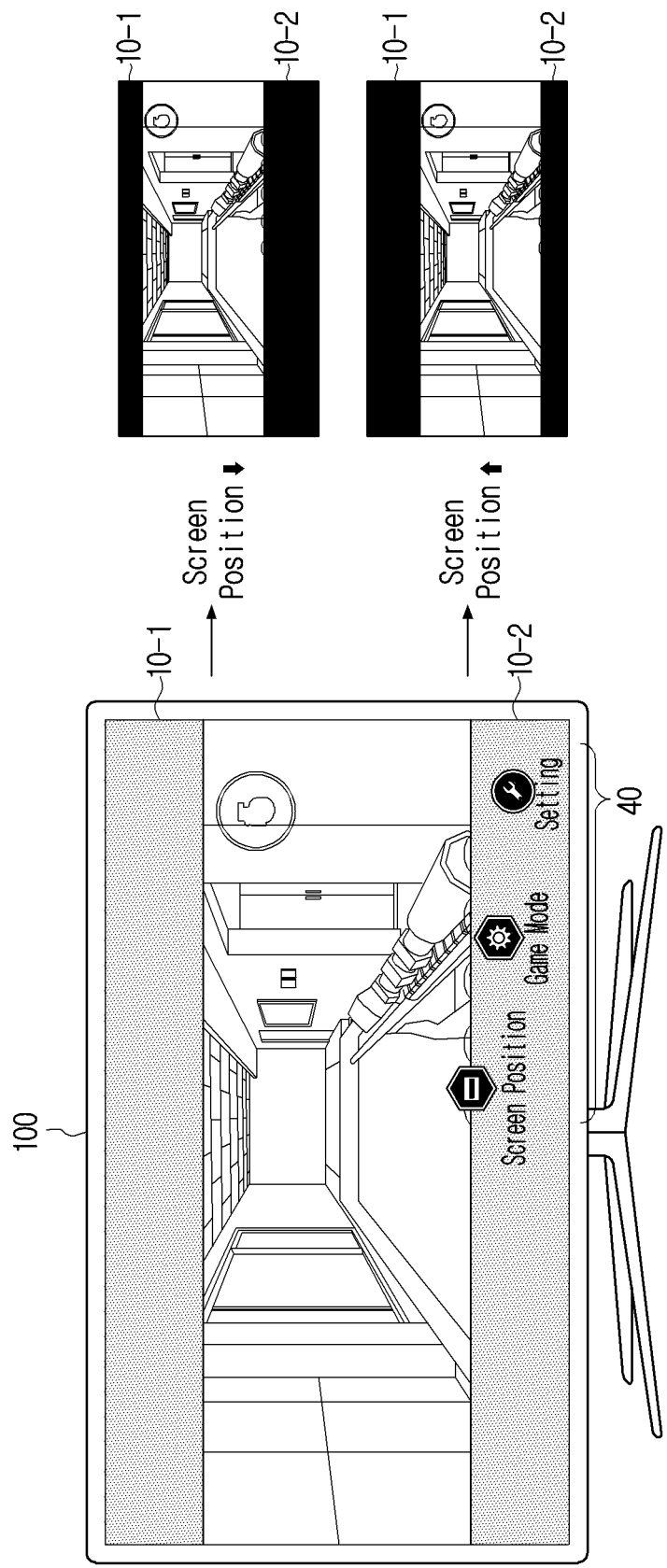
FIG. 8 is a view provided to explain a display position of a content area according to an embodiment.

FIG. 8 is a view provided to explain a display position of a content area according to an embodiment.

As illustrated in FIG. 7 and FIG. 8, according to a user command regarding the GUI for adjusting the display position of the content area, the processor 130 may move the display position of the content area to the upper side or to the lower side.

For example, when the GUI 40 for adjusting the display position of the content area is selected and a user command for moving the content area to the upper side is received, the processor 130 may decrease the size of the first black box area 10-1 and increase the size of the second black box area 10-2.

In another example, when the GUI 40 for adjusting the display position of the content area is selected and a user command for moving the content area to the lower side is received, the processor 130 may increase the size of the first black box area 10-1 and decrease the size of the second black box area 10-2.

In this case, the processor 130 may adjust the display position of the content area according to the user command regardless of whether an additional GUI is displayed other than the content.

When the display position of the content area is adjusted according to the user command and then, the GUI is displayed, the processor 130 according to an embodiment may display the GUI in the black box area 10 of which size is increased.

For example, the processor 130 may move the display position of the content area to the upper side according to a user command. In this case, the processor 130 may decrease the size of the first black box area 10-1, and increase the size of the second black box area 10-2. Subsequently, when a user command for displaying the GUI is received, the processor 130 may display the GUI in the second black box area 10-2 of which size has been increased.

Referring back to FIG. 2, the processor 130 according to an embodiment may adjust the display position of the content area in the upper side or lower side direction based on information on an object included in the upper area and the lower area of the content area.

For example, we may assume a case in which a content is a game content, for example a first-person shooter (FPS) game content, and a character object that is controlled according to a user command is included in the lower area of the content area. In this case, the processor 130 may identify that the character object is located at the lower area based on the object information, and increase the size of the second black box area 10-2 so that the GUI is included in the second black box area 10-2 located at the lower side of the content area.

For example, each of the character object and the GUI may respond to a user manipulation, and the area where the character object and the GUI are displayed is the user's region of interest, which may be displayed adjacently so that the user's gaze is not distracted. In order for the GUI to be displayed in a position adjacent to the character object, the processor 130 may increase the size of one of the first black box area 10-1 or the second black box area 10-2 based on the object information, and display the GUI in the black box area 10 of which size is increased.

Here, the character object is only an example, and embodiments are not limited thereto.

In another example, the processor 130 may identify a user's region of interest (ROI) in the content area based on information on an object included in the upper area and the lower area of the content area, and increase the size of one of the first black box area 10-1 or the second black box area 10-2 and display the GUI in the black box area 10 of which size is increased so that the user's gaze is not distracted as the GUI is displayed in a position adjacent to the identified region of interest.

The processor 130 may also identify the user's region of interest based on the area where an object according to a user setting is displayed, the area where main information is displayed, the area where a pointer, or for example a cursor, is displayed, etc.

The GUI-related information according to an embodiment may include color information of the GUI and color information in case the GUI is displayed in the black box area 10.

For example, when the GUI includes a black image and the GUI is displayed in the black box area 10, there is a problem that it may be difficult to identify the GUI from the user's point of view.

The processor 130 according to an embodiment may display the GUI based on color information when the GUI is displayed in the black box area 10 so that even when the GUI is displayed in the black box area 10, the GUI is easily identified from the user's point of view, or a text, image, etc. in the GUI is easily identified from the user's point of view.

Here, the color information of the GUI and the color information when the GUI is displayed in the black box area 10 may have a complementary color relationship.

For example, when the color information of the GUI includes a black image, the color information in the case where the GUI is displayed in the black box area 10 may include the corresponding image as a yellow image. Even when the GUI is displayed in the black box area 10, the processor 130 may display the GUI using a color other than black (e.g., yellow which is a complementary color, etc.) to easily identify the GUI from the user's point of view.

Meanwhile, the above embodiment is only an example, and embodiments are not limited thereto. For example, the black box area 10 may mean an area where a content is not displayed, and the black box area 10 may be displayed using a white band, etc. rather than a black band. In this case, even when the GUI is displayed in the black box area 10, the processor 130 may display the GUI using a color other than white and yellow (e.g., black which is a complementary color, etc.) based on color information in the case where the GUI is displayed in the black box area 10, to easily identify the GUI from the user's point of view.

According to an embodiment, the aspect ratio of the content area and the aspect ratio of the display 120 may be the same. In this case, the processor 130 may control the display 120 to display the content area by reducing the size of the content area while maintaining the aspect ratio of the content area.

The processor 130 may control the display 120 to display the GUI in the black box area 10 which is generated as the size of the content area is reduced. Subsequently, when a user input regarding the GUI is received or the displayed GUI disappears for a predetermined time, the size of the content area may be restored to its original state.

For example, when the aspect ratio of the content area and the aspect ratio of the display 120 are the same or similar, the processor 130 may display both a letterbox and a pillarbox by reducing the size of the content area while maintaining the aspect ratio of the content area. Subsequently, the processor 130 may display a GUI according to a user command in one of a plurality of black box areas 10 so that a part of the content area is not covered by the GUI.

As described above, the processor 130 may increase the size of one of a plurality of black box areas and decrease the size of the remaining black box areas and then, display the GUI in the black box area of which size is increased.

Subsequently, when a user input regarding the GUI is completed or the GUI disappears after being displayed for a predetermined time, the processor 130 may restore the size of the content area to its original size and remove the plurality of black box areas.

Figure 9:
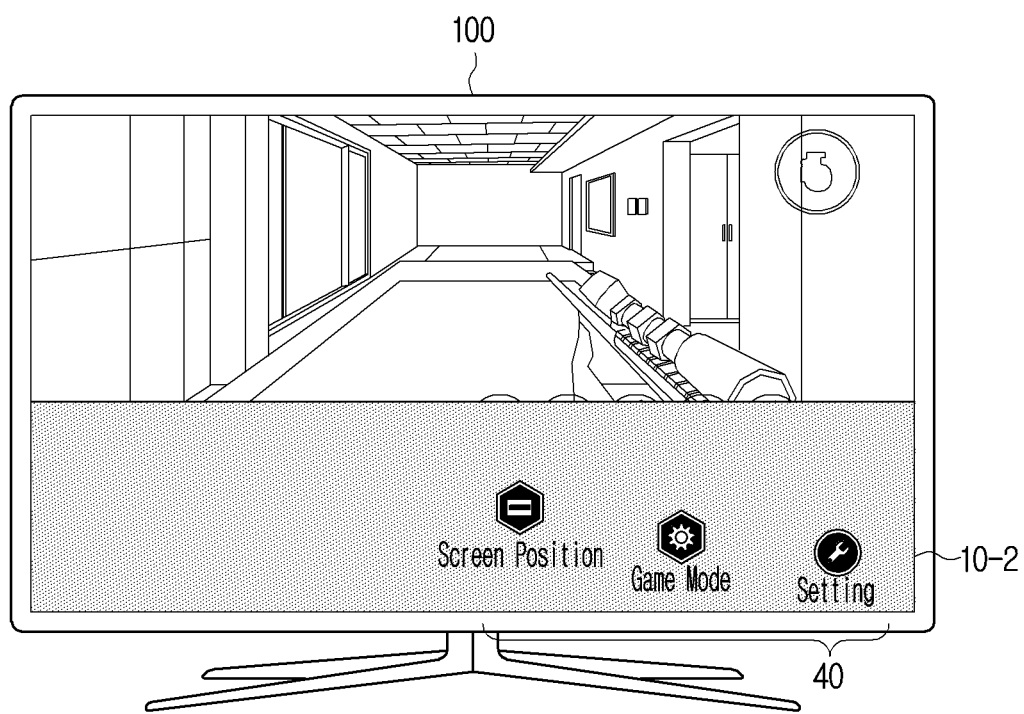
FIG. 9 is a view provided to explain a display position of a content area and a GUI according to an embodiment.

FIG. 9 is a view provided to explain a display position of a content area and a GUI according to an embodiment.

Referring to FIG. 9, the content area according to an embodiment may move to the upper side or lower side of the display 120. As described above, the processor 130 may move the content area to the upper side or lower side of the display 120 automatically or according to a user command.

As illustrated in FIG. 9, the processor 130 may move the content area to the upper side of the display 120 automatically, for example according to a predetermined bar, or according to a user command.

In this case, the first black box area 10-1 on the upper side of the content area may disappear, and only the second black box area 10-2 on the lower side of the content area may be displayed. The GUI may be displayed in the second black box area 10-2.

In another example, the processor 130 may move the content area to the lower side of the display 120 automatically for example according to a predetermined bar, or according to a user command.

In this case, the second black box area 10-2 on the lower side of the content area may disappear, and only the first black box area 10-1 on the upper side of the content area may be displayed. The GUI may be displayed in the first black box area 10-1.

Meanwhile, in the above-described various embodiments, the content area may mean an area where an image is provided according to content data or an area on the display excluding the black box area 10 on the display.

For example, in case where a content is provided through the display 120 while maintaining the aspect ratio (e.g., 16:9) of the content, the content area may mean the remaining area in the display 120 excluding the black box area 10 generated in the display 120.

Figure 10:
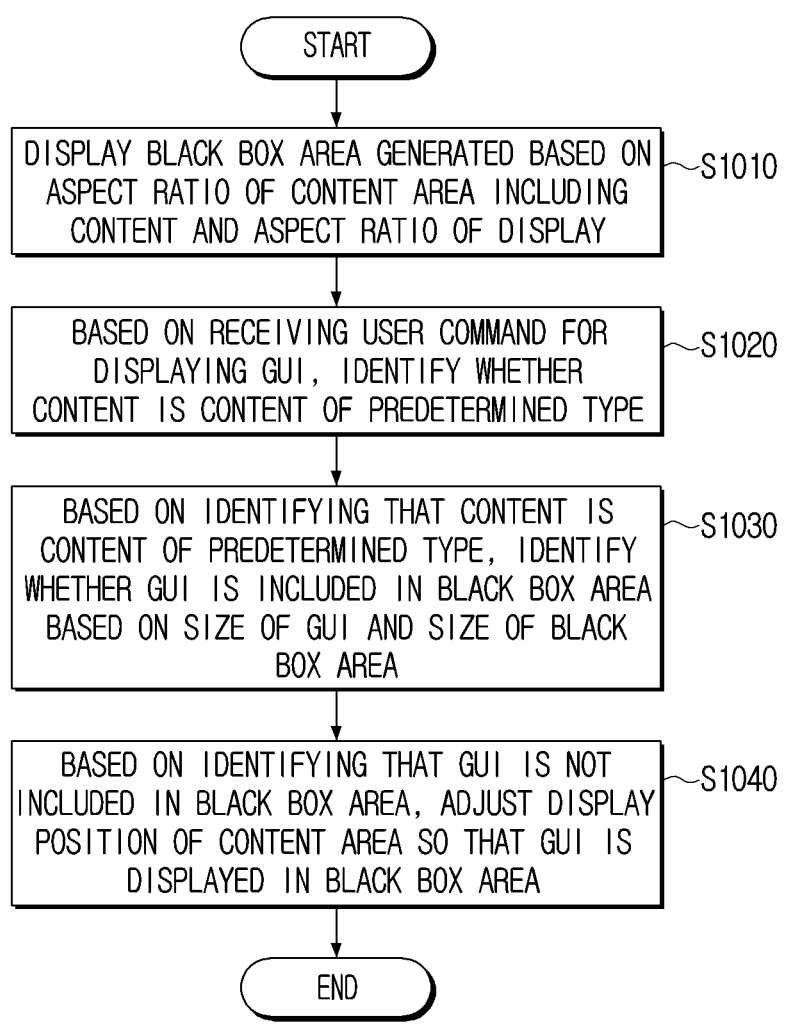
FIG. 10 is a flowchart provided to explain a controlling method of an electronic apparatus according to an embodiment.

FIG. 10 is a flowchart provided to explain a controlling method of an electronic apparatus according to an embodiment.

The controlling method of an electronic apparatus according to an embodiment may include, firstly, displaying a black box area that is generated based on the aspect ratio of the content area including a content and the aspect ratio of the display, at operation S1010.

Subsequently, when a user command for displaying a GUI is received, it is identified whether the content is a content of a predetermined type based on the type information of the content, at operation S1020.

If it is identified that the content is a content of a predetermined type, it is identified whether the GUI is included in a black box area based on the size of the GUI and the size of the black box area, at operation S1030.

Subsequently, if it is identified that the GUI is not included, or for example not entirely included, in the black box area, the display position of the content area may be adjusted so that the GUI is displayed in the black box area, at operation S1040.

Here, the operation S1010 that displays the black box area may include displaying the first black box area and the second black box area which are generated based on the aspect ratio of the content area and the aspect ratio of the display in the upper side and the lower side of the content area, respectively, and the operation S1040 of adjusting the display position may include, based on identifying that the GUI is not included, or for example not entirely included, in the first black box area or the second black box area, adjusting the display position of the content area in the upper side direction or the lower side direction.

Here, the operation S1040 of adjusting the display position may include increasing the size of one of the first black box area or the second black box area and decreasing the size of the other area by adjusting the display position of the content area in the upper side direction or the lower side direction, and further include displaying the GUI in the black box area of which size is increased.

In addition, the operation S1040 of adjusting the display position may include adjusting the display position of the content area in the upper side direction or the lower side direction based on the object information included in the upper area and the lower area of the content area.

In addition, embodiments may further include, if it is identified that the content is a content of a predetermined type, identifying whether the GUI is included in the black box area based on the size of the GUI and the size of the black box area which are obtained based on information related to the GUI, and if it is identified that the GUI is not included, or for example not entirely included, in the black box area, adjusting the size of the GUI so that the GUI is included in the black box area and displaying the GUI of which size is adjusted in the black box area.

Further, the information related to the GUI may include color information in a case where the GUI is included in the black box area, and the operation S1040 of displaying the GUI in the black box area may include, based on the content being identified as a content of a predetermined type, displaying the GUI in the black box area based on color information obtained based on the information related to the GUI.

The controlling method according to an embodiment may further include displaying a GUI for adjusting the display position of a content according to a user command and adjusting the display position of the content area to the upper side or to the lower side of the content area according to a user input regarding the GUI.

The controlling method of an embodiment may include, based on the aspect ratio of the content area and the aspect ratio of the display being the same, reducing and displaying the size of the content area while maintaining the aspect ratio of the content area, displaying the black box area which is generated as the size of the content area is reduced, displaying the GUI in the black box area, and based on receiving a user input regarding the GUI, displaying the content area by restoring the size of the content area to its original state.

In addition, the type information of a content may include a game type.

However, various embodiments of the present disclosure may be applicable not only to an electronic apparatus but also all types of electronic apparatuses having a display.

Embodiments described above may be implemented in a computer or an apparatus similar to the computer using software, hardware, or a combination of software and hardware. In some cases, embodiments described in the disclosure may be implemented as a processor itself. According to a software implementation, embodiments such as procedures and functions described in the specification may be implemented as separate software modules. Each of the software modules may perform one or more functions and operations described in the disclosure.

In embodiments, computer instructions for performing processing operations of the electronic apparatus according to the various embodiments of the disclosure described above may be stored in a non-transitory computer-readable medium. The computer instructions stored in the non-transitory computer-readable medium allow a specific apparatus to perform the processing operations in the electronic apparatus 100 according to the various embodiments described above when they are executed by a processor of the specific apparatus.

The non-transitory computer-readable medium may be not a medium that stores data for a while, such as a register, a cache, a memory, or the like, and may be a medium that semi-permanently stores data and is readable by the device. Specific examples of the non-transitory computer-readable medium may include a compact disk (CD), a digital versatile disk (DVD), a hard disk, a Blu-ray disk, a USB, a memory card, a read only memory (ROM), and the like.

Although the embodiments of the disclosure have been illustrated and described hereinabove, the disclosure is not limited to the specific embodiments described above, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. An electronic apparatus comprising:
   a memory configured to store information related to Graphical User Interface (GUI);
   a display; and
   a processor configured to:
   control the display to display a content area including a content and a black box area generated based on an aspect ratio of the content area and an aspect ratio of the display;
   based on receiving a user command for displaying a GUI, determine whether the content has a predetermined type based on type information of the content;
   based on determining that the content has the predetermined type, determine whether the GUI is overlaid on the black box area based on a size of the GUI and a size of the black box area; and
   based on determining that the GUI is at least partially overlaid on the content area, adjust a display position of the content area such that an entirety of the GUI is overlaid on the black box area.

2. The apparatus as claimed in claim 1, wherein the processor is further configured to:
   control the display to display a first black box area at an upper side of the content area and a second black box area at a lower side of the content area, wherein the first black box area and the second black box area are generated based on the aspect ratio of the content area and the aspect ratio of the display; and
   based on determining that the GUI is not included in the first black box area and the second black box area, adjust the display position of the content area in an upper side direction or a lower side direction.

3. The apparatus as claimed in claim 2, wherein the processor is further configured to increase a size of one of the first black box area or the second black box area and decrease a size of another one of the first black box area or the second black box area, by adjusting the display position of the content area in the upper side direction or the lower side direction, and control the display to display the GUI in the one of the first black box area or the second black box area having the increased size.

4. The apparatus as claimed in claim 2, wherein the processor is further configured to adjust the display position of the content area in the upper side direction or the lower side direction based on information about an object included in an upper area of the content area and a lower area of the content area.

5. The apparatus as claimed in claim 1, wherein the processor is further configured to:
   based on determining that the content has the predetermined type, determine whether the GUI is included in the black box area based on a size of the GUI and a size of the black box area obtained based on information related to the GUI; and
   based on determining that the GUI is not included in the black box area, adjust the size of the GUI such that the GUI is included in the black box area, and control the display to display the GUI having the adjusted size in the black box area.

6. The apparatus as claimed in claim 1, wherein the information related to the GUI includes color information when the GUI is displayed in the black box area; and
   wherein the processor is further configured to, based on determining that the content has the predetermined type, control the display to display the GUI in the black box area based on the color information.

7. The apparatus as claimed in claim 1, wherein the processor is further configured to:
   control the display to display an adjustment GUI for adjusting the display position of the content area according to a user command for adjusting the display position of the content area; and
   control the display to adjust the display position of the content area to an upper side or to a lower side according to a user input regarding the adjustment GUI.

8. The apparatus as claimed in claim 1, wherein the processor is further configured to:
   based on the aspect ratio of the content area being equal to the aspect ratio of the display, control the display to display the content area by reducing a size of the content area while maintaining the aspect ratio of the content area;
   control the display to display the black box area as the size of the content area is reduced;
   control the display to display the GUI in the black box area; and
   based on receiving a user input regarding the GUI, control the display to display the content area by restoring the size of the content area to an original size.

9. The apparatus as claimed in claim 1, wherein the type information of the content includes a game type.

10. The electronic apparatus of claim 1, wherein based on the entirety of the GUI being overlaid on the black box area, no portion of the GUI is overlaid on the content area.

11. A controlling method of an electronic apparatus including a display, the method comprising:
    displaying a black box area generated based on an aspect ratio of a content area including a content and an aspect ratio of the display;
    based on receiving a user command for displaying a GUI, determining whether the content has a predetermined type based on type information of the content;
    based on determining that the content has the predetermined type, determining whether the GUI is overlaid on the black box area based on a size of the GUI and a size of the black box area; and
    based on determining that the GUI is at least partially overlaid on the content area, adjusting a display position of the content area such that an entirety of the GUI is overlaid on the black box area.

12. The method as claimed in claim 11, wherein the displaying of the black box area comprises displaying a first black box area at an upper side of the content area and a second black box area at a lower side of the content area, wherein the first black box area and the second black box area are generated based on the aspect ratio of the content area and the aspect ratio of the display; and wherein the determining of the display position comprises, based on determining that the GUI is not included in the first black box area and the second black box area, adjusting the display position of the content area in an upper side direction or a lower side direction.

13. The method as claimed in claim 12, wherein the adjusting a display position comprises:

increasing a size of one of the first black box area or the second black box area and decreasing a size of another one of the first black box area or the second black box area, by adjusting the display position of the content area in the upper side direction or the lower side direction; and displaying the GUI the one of the first black box area or the second black box area having the increased size.

14. The method as claimed in claim 12, wherein the adjusting the display position comprises adjusting the display position of the content area in the upper side direction or the lower side direction based on information about an object included in an upper area of the content area and a lower area of the content area.

15. The method as claimed in claim 11, wherein the displaying the GUI in the black box area comprises:

based on determining that the GUI is not included in the black box area, adjusting the size of the GUI such that the GUI is included in the black box area; and displaying the GUI having the adjusted size in the black box area.

16. The method as claimed in claim 11, wherein the information related to the GUI includes color information when the GUI is displayed in the black box area; and wherein the displaying the GUI in a black box area comprises, based on determining that the content has the predetermined type, displaying the GUI in the black box area based on the color information.

17. A controlling method of an electronic apparatus including a display, the method comprising:

displaying a black box area generated based on an aspect ratio of a content area including a content and an aspect ratio of the display;

displaying a GUI on the display;

determining whether the GUI is entirely overlaid on the black box area based on a size of the GUI and a size of the black box area; and based on determining that a portion of the GUI is not entirely overlaid on the black box area, adjusting at least one from among a display position of the content area or the size of the GUI such that the GUI is entirely overlaid on the black box area.

18. The method of claim 17, wherein the black box area includes a first black box area and a second black box area, and wherein the adjusting comprises adjusting the display position of the content area such that the GUI is entirely included in one from among the first black box area and the second black box area.

* * * * *